(12) United States Patent
Jen et al.

(10) Patent No.: US 8,786,215 B2
(45) Date of Patent: Jul. 22, 2014

(54) DOUBLE-OUTPUT HIGH-EFFICIENCY LED LIGHT-MODULATING CIRCUIT

(71) Applicant: Chung-Shan Institute of Science and Technology, Taoyuan (TW)

(72) Inventors: Kuo-Kuang Jen, Taoyuan (TW);
Kuo-Sheng Fu, Taoyuan (TW);
Ying-Sun Huang, Taoyuan (TW);
Ywh-Ming Gong, Taoyuan (TW);
Zen-Shan Chang, Taoyuan (TW)

(73) Assignee: Chung-Shan Institute of Science and Technology (TW)

( * ) Notice: Subject to any disclaimer, the term of this patent is extended or adjusted under 35 U.S.C. 154(b) by 35 days.

(21) Appl. No.: 13/714,381

(22) Filed: Dec. 13, 2012

(65) Prior Publication Data
US 2014/0167649 A1    Jun. 19, 2014

(51) Int. Cl.
| | | |
|---|---|---|
| *G05F 1/00* | (2006.01) | |
| *H05B 37/02* | (2006.01) | |
| *H05B 39/04* | (2006.01) | |
| *H05B 41/36* | (2006.01) | |
| *H05B 33/08* | (2006.01) | |
| *H05B 41/282* | (2006.01) | |

(52) U.S. Cl.
CPC ........ *H05B 33/0815* (2013.01); *H05B 33/0824* (2013.01); *H05B 41/2821* (2013.01)
USPC ............ 315/307; 315/247; 315/291; 315/297

(58) Field of Classification Search
None
See application file for complete search history.

(56) References Cited

U.S. PATENT DOCUMENTS

2003/0227784 A1* 12/2003 Qiao et al. .................. 363/21.14
2006/0214603 A1*  9/2006 Oh et al. ........................ 315/246

* cited by examiner

*Primary Examiner* — Anh Tran
(74) *Attorney, Agent, or Firm* — Schmeiser, Olsen & Watts LLP (57) ABSTRACT

The present invention relates to a double-output high-efficiency LED light-modulating circuit, comprising: a single-stage flyback power factor corrector, a DC/DC convertor, an LED module, and a light-modulating switch. In the present invention, it mainly utilizes the single-stage flyback power factor corrector for carrying out the purposes of reducing the components of an LED luminaire controlling circuit and increasing the circuit power conversion efficiency. Moreover, the double-output high-efficiency LED light-modulating circuit further includes a twin-bus light modulation framework, which can not only reduce the cross voltage of the power switch in back-end DC/DC convertor, but also process a high-frequency light modulation and a low-frequency light modulation to the LED luminaire. Therefore, because the cross voltage of the power switch has been reduced, a power switch with lower $R_{ds}$ can be used in the back-end DC/DC convertor for increasing switching speed and reducing switching losses.

7 Claims, 13 Drawing Sheets

DOUBLE-OUTPUT HIGH-EFFICIENCY LED LIGHT-MODULATING CIRCUIT

BACKGROUND OF THE INVENTION

1. Field of the Invention

The present invention relates to an LED driving circuit, and more particularly to a double-output high-efficiency LED light-modulating circuit having twin-bus framework.

2. Description of the Prior Art

Light-emitting diode (LED) is one of the conventional lighting devices; comparing to the traditional incandescent bulb, LED lamp shows the advantages of high luminous efficiency and energy-saving. Because the LED device cannot be directly electrically connected to the AC outlet on the wall, LED driving circuits are developed and proposed. Currently, the LED driving circuits are divided into linear driving circuit and switch driving circuit, wherein the switch driving circuit often includes a power factor correction circuit.

Figure 1:
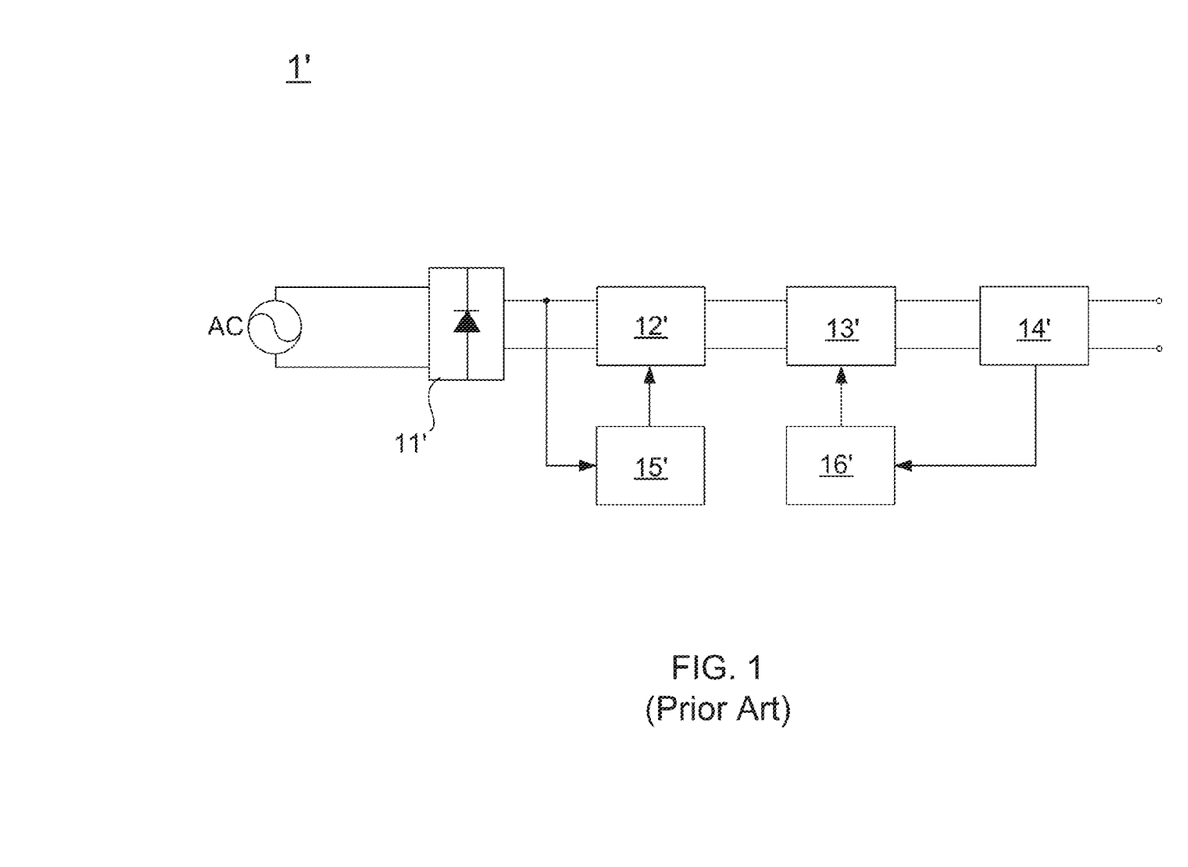
FIG. 1 is a framework diagram of a conventional switch LED driving circuit.

Please refer to FIG. 1, which illustrates a framework diagram of a conventional switch LED driving circuit. As shown in FIG. 1, the conventional switch LED driving circuit 1' consists of a rectifying unit 11', a power factor correcting unit 12', a DC/DC converting unit 13', an output unit 14, a PFC controlling unit 15', and a convertor controlling unit 16'. In the switch LED driving circuit 1', the power factor correcting unit 12' is first-stage circuit, such as boost converter or buck converter, and the DC/DC converting unit 13' is second-stage circuit for modulating the output voltage.

The aforesaid switch LED driving circuit 1' performs high power-correction effect and is capable of modulating the output voltage rapidly. However, as shown in FIG. 1, the power factor correcting unit 12' and the DC/DC converting unit 13' are controlled by the PFC controlling unit 15' and the convertor controlling unit 16', respectively, and the two controlling units not only cause the whole circuit of the switch LED driving circuit 1' become complex, but also result in that the whole circuit area of the switch LED driving circuit 1' cannot be effective reduced. Moreover, the power dissipation of the two controlling units also cause a low power conversion efficiency to the switch LED driving circuit 1'.

Thus, in view of the conventional switch LED driving circuit still has shortcomings and drawbacks, the inventor of the present application has made great efforts to make inventive research thereon and eventually provided a double-output high-efficiency LED light-modulating circuit.

SUMMARY OF THE INVENTION

The first objective of the present invention is to provide a double-output high-efficiency LED light-modulating circuit, in which a single-stage flyback power factor corrector is used for carrying out the purpose of reducing the components of an LED luminaire controlling circuit and increasing the circuit power conversion efficiency. Moreover, the double-output high-efficiency LED light-modulating circuit further includes a twin-bus light modulation framework, which can not only reduce the cross voltage of the power switch in back-end DC/DC convertor, but also process a high-frequency light modulation and a low-frequency light modulation to the LED luminaire; therefore, because the cross voltage of the power switch has been reduced, a power switch with lower $R_{ds}$ can be used in the back-end DC/DC convertor for increasing switching speed and reducing switching losses.

Accordingly, to achieve the primary objective of the present invention, the inventor of the present invention provides a double-output high-efficiency LED light-modulating circuit, comprising:

a single-stage flyback power factor corrector, coupled to an AC input voltage signal and capable of outputting a first LED voltage and a second LED voltage slightly larger than the second LED voltage, so as to complete a twin-bus output;

a DC/DC convertor, coupled to the single-stage flyback power factor corrector for receiving the first LED voltage and the second LED voltage;

an LED module, coupled to the DC/DC convertor and the single-stage flyback power factor corrector; and a light-modulating switch, coupled to the LED module and the single-stage flyback power factor corrector, so as to receive the first LED voltage and process a high-frequency light modulation and a low-frequency light modulation to the LED module.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a double-output high-efficiency LED light-modulating circuit according to the present invention, embodiments of the present invention will be described in detail with reference to the attached drawings hereinafter.

Figure 2:
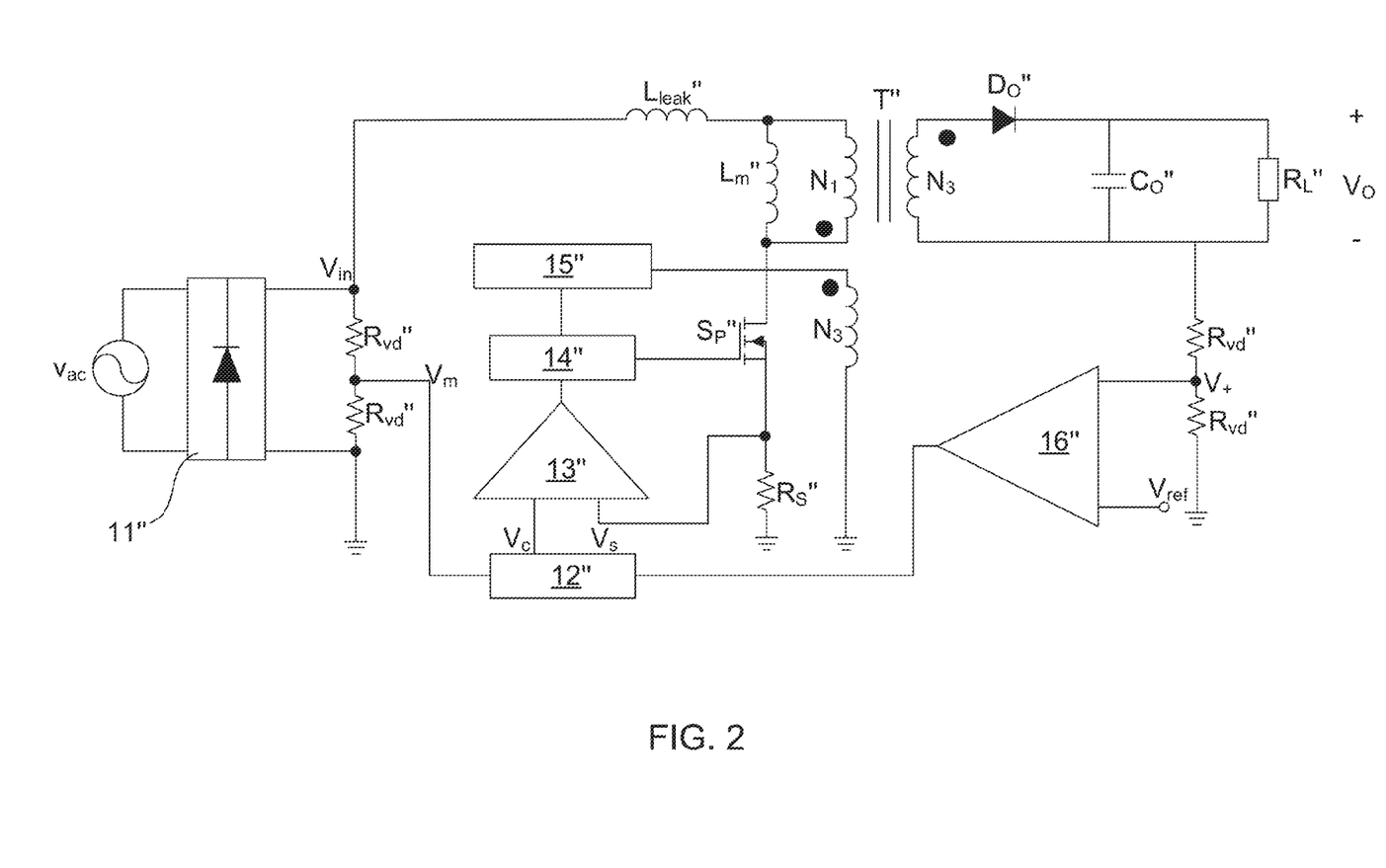
FIG. 2 is a circuit block diagram of a single-stage flyback DC convertor having power factor corrector.

Before describing the double-output high-efficiency LED light-modulating circuit of the present invention, a single-stage flyback DC convertor having power factor corrector will be firstly introduced in follows. Please refer to FIG. 2, which illustrates a circuit block diagram of the single-stage flyback DC convertor having power factor corrector. As shown in FIG. 2, the single-stage flyback DC convertor having power factor corrector consists of a bridge rectifying unit

11", a plurality of voltage dividing resistor $R_{vd}$", a multiplier 12", a comparator 13", a trigger circuit 14", a zero current detecting circuit 15", a switch $S_p$", a switch resistor $R_s$", a transformer T", a output diode $D_o$", a output capacitor $C_o$", a load resistor $R_L$", and an error amplifier 16"; wherein the transformer T" includes a leakage inductor $L_{leak}$", a magnetizing inductor $L_m$" and a turn ratio of $N_1:N_2:N_3$.

As shown in FIG. 2, an AC input voltage signal $V_{ac}$ is processed a full-cycle rectification by the bridge rectifying unit 11" and becomes an input voltage signal $V_{in}$; therefore the input voltage signal $V_{in}$ is transformed to an input sine-wave voltage signal $V_m$ through the voltage dividing resistor $R_{vd}$". On the other hand, the output voltage $V_o$ is divided to a reference voltage $V_+$ via the voltage dividing resistor $R_{vd}$", and then a reference signal $V_r$ is outputted by way of comparing the reference voltage $V_+$ and the error amplifier 16". Furthermore, the reference signal $V_r$ and the input sine-wave voltage signal $V_m$ are transformed to a sine-wave controlling voltage $V_c$ via the multiplication operation processed by the multiplier 12"; besides, the input current is transformed to a current detecting signal $V_s$ through the switch resistor $R_s$".

Figure 3:
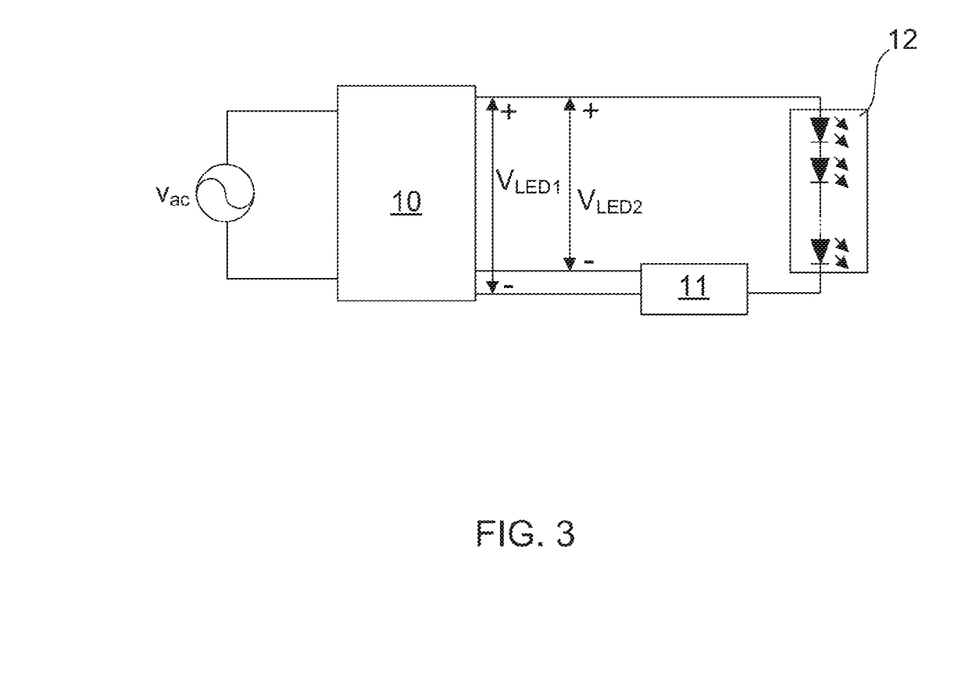
FIG. 3 is a framework diagram of a double-output high-efficiency LED light-modulating circuit according to the present invention.

The double-output high-efficiency LED light-modulating circuit of the present invention is carried out by using aforesaid single-stage flyback DC convertor having power factor corrector as base circuit and further including a twin-bus circuit for PWM light modulation. Please refer to FIG. 3, there is shown a framework diagram of the double-output high-efficiency LED light-modulating circuit according to the present invention. As shown in FIG. 3, the double-output high-efficiency LED light-modulating circuit mainly consists of a single-stage flyback power factor corrector 10, a DC/DC convertor 11 and an LED module 12.

Figure 4:
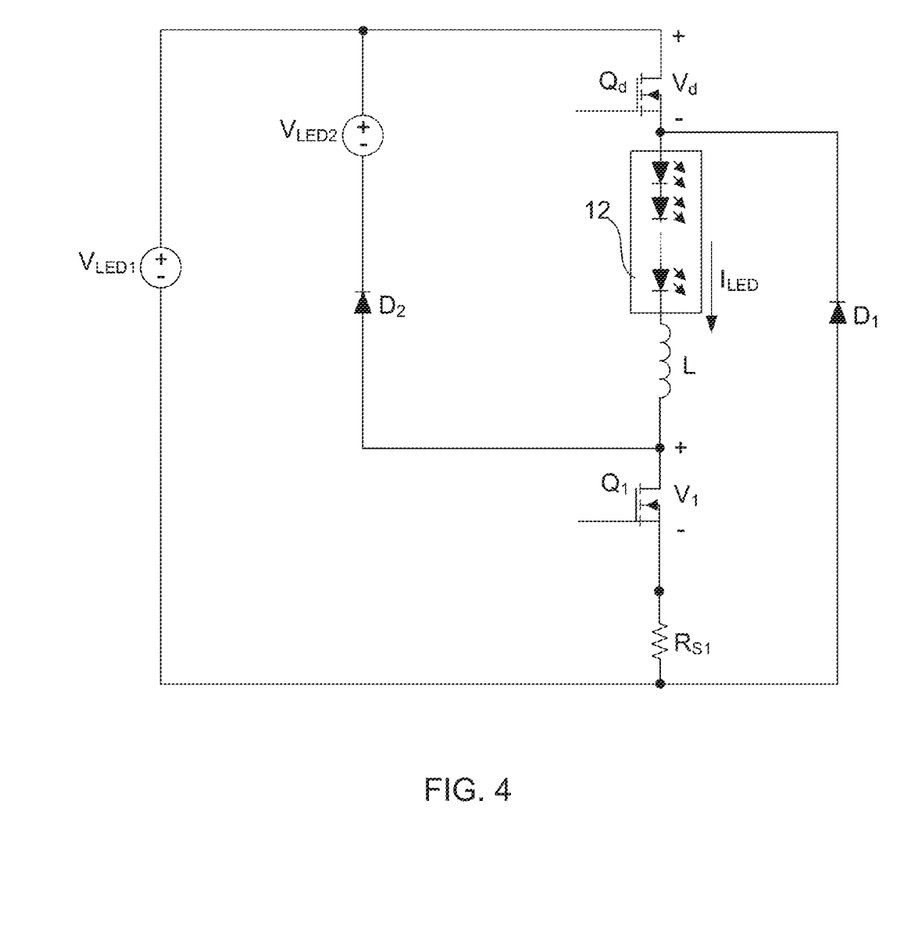
FIG. 4 is a circuit diagram of the double-output high-efficiency LED light-modulating circuit according to the present invention.

Continuously refer to FIG. 3, and please simultaneously refer to FIG. 4, which illustrates a circuit diagram of the double-output high-efficiency LED light-modulating circuit according to the present invention. As shown in FIG. 3 and FIG. 4, the single-stage flyback power factor corrector 10 is a power controlling integrated circuit (IC) with serial number of L6561, which is coupled to an AC input voltage signal $V_{ac}$ and capable of outputting a first LED voltage $V_{LED1}$ and a second LED voltage $V_{LED2}$, so as to complete a twin-bus output; wherein the first LED voltage $V_{LED1}$ is slightly larger than the second LED voltage $V_{LED2}$. The DC/DC convertor 11 is coupled to the single-stage flyback power factor corrector 10 for receiving the first LED voltage $V_{LED1}$ and the second LED voltage $V_{LED2}$. The LED module 12 is coupled to the DC/DC convertor 11 and the single-stage flyback power factor corrector 10, wherein the LED module 12 consists of a plurality of LED device and emits light driven by the first LED voltage $V_{LED1}$. As shown in FIG. 4, for controlling the light emitting, a light-modulating switch $Q_d$ is coupled to the LED module 12 and the single-stage flyback power factor corrector 10 for receiving the first LED voltage $V_{LED1}$. Herein the light-modulating switch $Q_d$ is a MOSFET and used for processing a high-frequency light modulation and a low-frequency light modulation to the LED module 12.

In this double-output high-efficiency LED light-modulating circuit, the DC/DC convertor 11 consists of an inductor L, a switch $Q_1$, a switch resistor $R_{S1}$, and a first diode $D_1$, in which the inductor L is coupled to the LED module 12, the switch $Q_1$ is coupled to the inductor L, the switch resistor $R_{S1}$ is coupled to the switch $Q_1$, and the first diode $D_1$ is coupled between the LED module 12 and the switch resistor $R_{S1}$. Particularly, in the present invention, the first diode $D_1$ is turned on when the high-frequency light modulation is processed, and a second diode $D_2$ coupled between the light-modulating switch $Q_d$ and the inductor L is turned on when the low-frequency light modulation is processed. For the first LED voltage $V_{LED1}$ crosses on the switch $Q_1$, the first LED voltage $V_{LED2}$ slightly smaller than the first LED voltage $V_{LED1}$ is added in the present invention, therefore the cross voltage on the switch $Q_1$ can been reduced.

Figure 5:
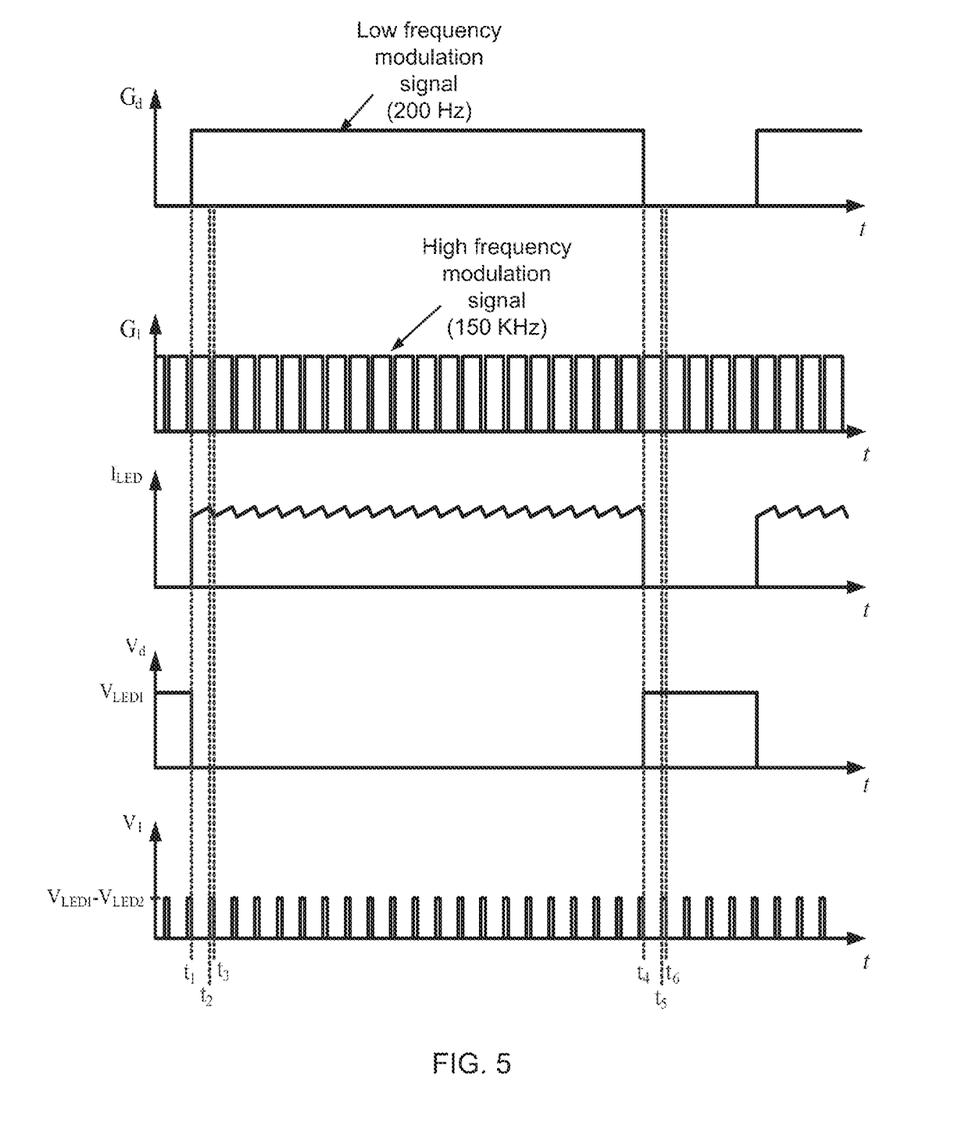
FIG. 5 is a theoretical waveform graph of the double-output high-efficiency LED light-modulating circuit.

Thus, through the descriptions, the circuit framework and components of the double-output high-efficiency LED light-modulating circuit have been completely introduced and disclosed. Next, the four circuit operation modes for this double-output high-efficiency LED light-modulating circuit will be introduced in follows. Please refer to FIG. 5, there is shown a theoretical waveform graph of the double-output high-efficiency LED light-modulating circuit. As shown in FIG. 5, the four circuit modes are respectively operated in the time intervals of $t_1 < t < t_2$, $t_2 < t < t_3$, $t_4 < t < t_5$, and $t_5 < t < t_6$.

Figure 6:
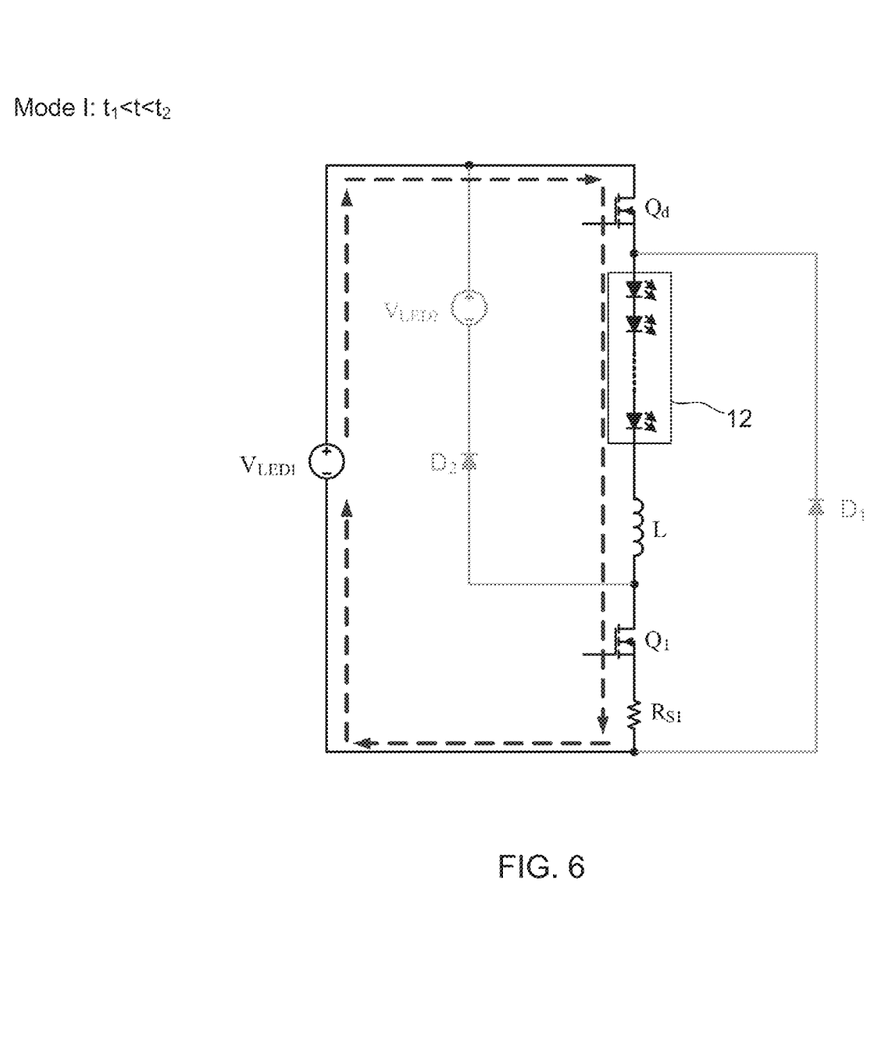
FIG. 6 is a schematic circuit operation diagram for mode I.
Figure 7:
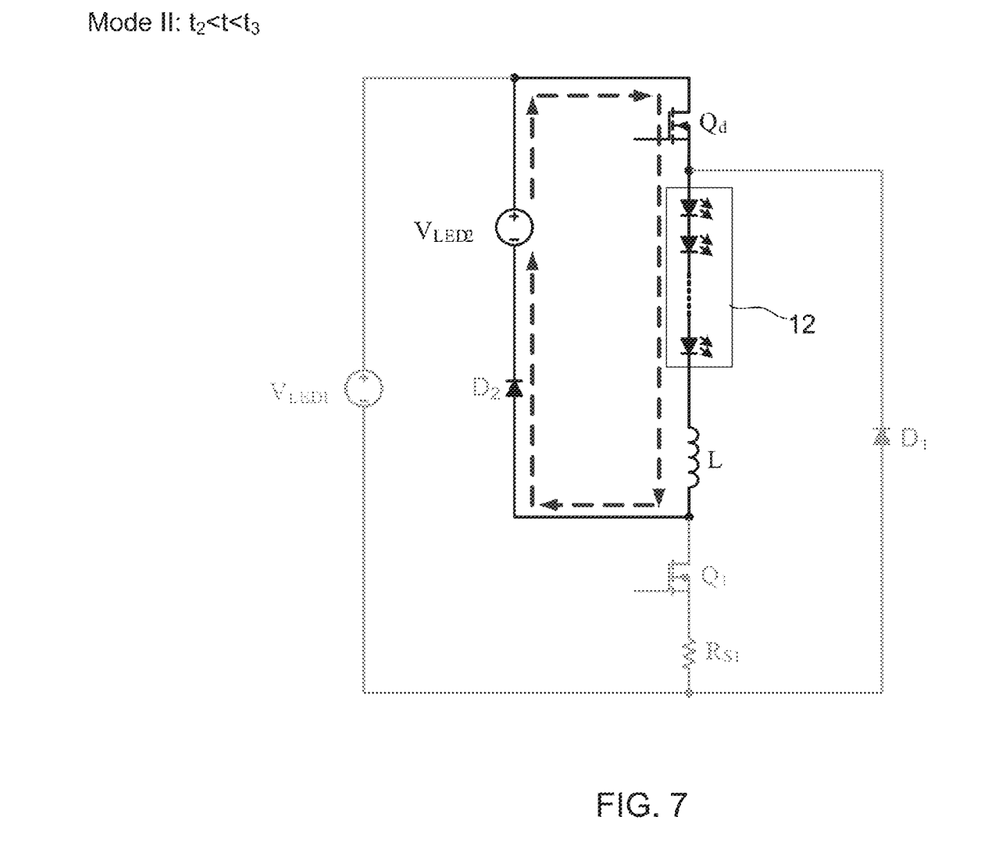
FIG. 7 is a schematic circuit operation diagram for mode II.

Please refer to FIG. 6, FIG. 7, FIG. 8, and FIG. 9, which illustrate the schematic circuit operation diagrams for mode I, mode II, mode III, and mode IV, respectively. As shown in FIG. 6, the double-output high-efficiency LED light-modulating circuit is operated in mode I circuit operation during the time interval of $t_1 < t < t_2$; meanwhile, the low-frequency light-modulating switch $Q_d$ and the high-frequency switch $Q_1$ of the DC/DC convertor 11 are turned on at the same time, and the current passes through the light-modulating switch $Q_d$ and the LED module 12, so as process the energy storage to the inductor L. Continuously, as shown in FIG. 7, the double-output high-efficiency LED light-modulating circuit is operated in mode II circuit operation during the time interval of $t_2 < t < t_3$. In this time interval, the low-frequency light-modulating switch $Q_d$ is turned on and the high-frequency switch $Q_1$ of the DC/DC convertor 11 is turned off, and the inductor L releases energy to the LED module 12 via the second diode $D_2$ and the light-modulating switch $Q_d$.

Figure 8:
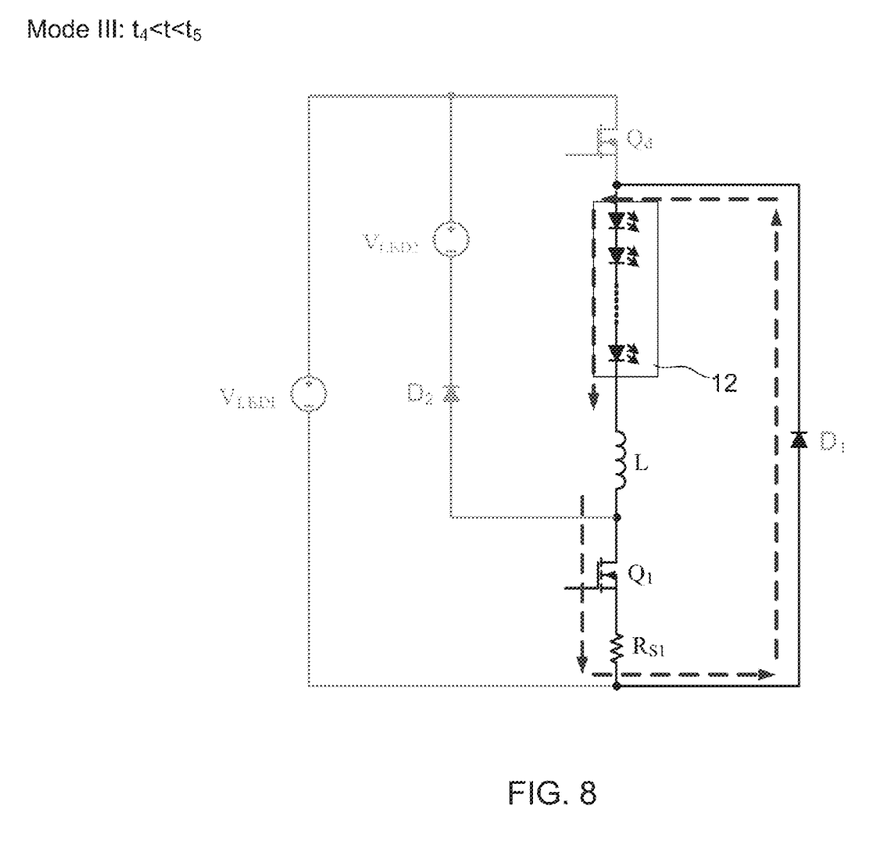
FIG. 8 is a schematic circuit operation diagram for mode III.
Figure 9:
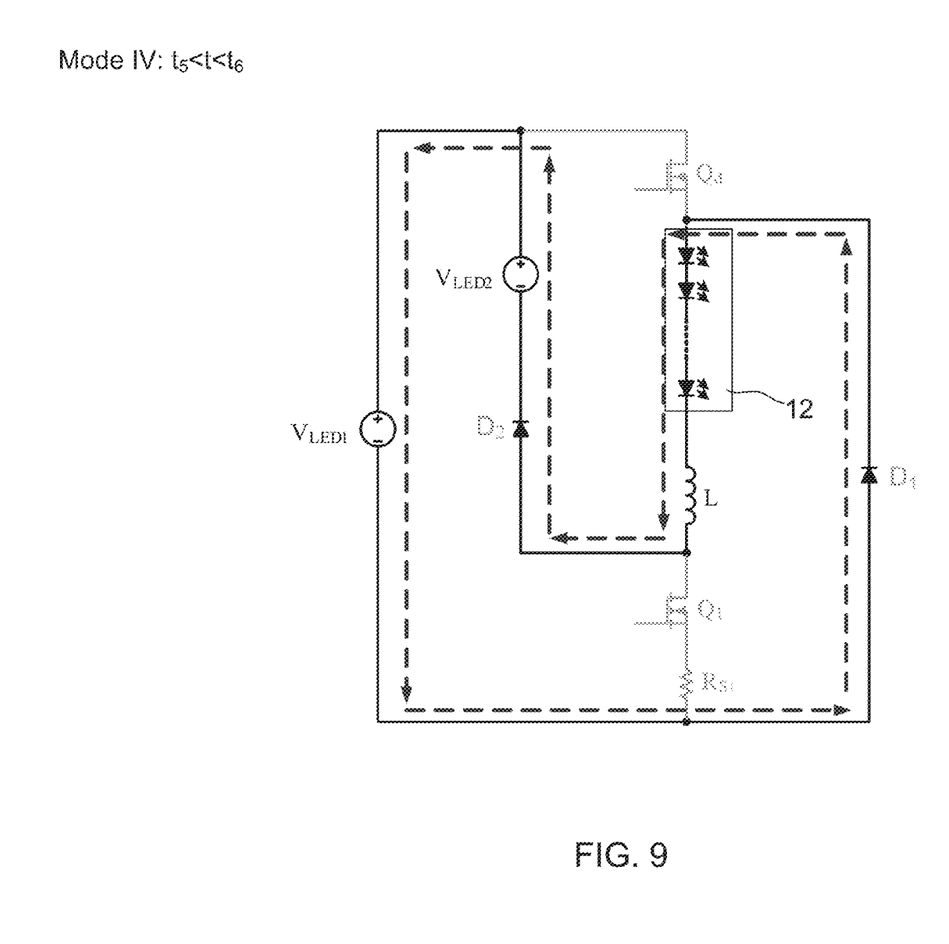
FIG. 9 is a schematic circuit operation diagram for mode IV.

Moreover, as shown in FIG. 8, the double-output high-efficiency LED light-modulating circuit is operated in mode III circuit operation during the time interval of $t_4 < t < t_5$; meanwhile, the low-frequency light-modulating switch $Q_d$ is turned off and the high-frequency switch $Q_1$ of the DC/DC convertor 11 is turned on, and the inductor L releases energy to the LED module 12 through the switch $Q_1$ and the first diode $D_1$. Eventually, as shown in FIG. 9, the double-output high-efficiency LED light-modulating circuit is operated in mode IV circuit operation during the time interval of $t_5 < t < t_6$. In this time interval, the low-frequency light-modulating switch $Q_d$ and the high-frequency switch $Q_1$ of the DC/DC convertor 11 are simultaneously turned off, and the inductor L releases energy to the LED module 12 through the second diode $D_2$ and the first diode $D_1$.

Figure 10:
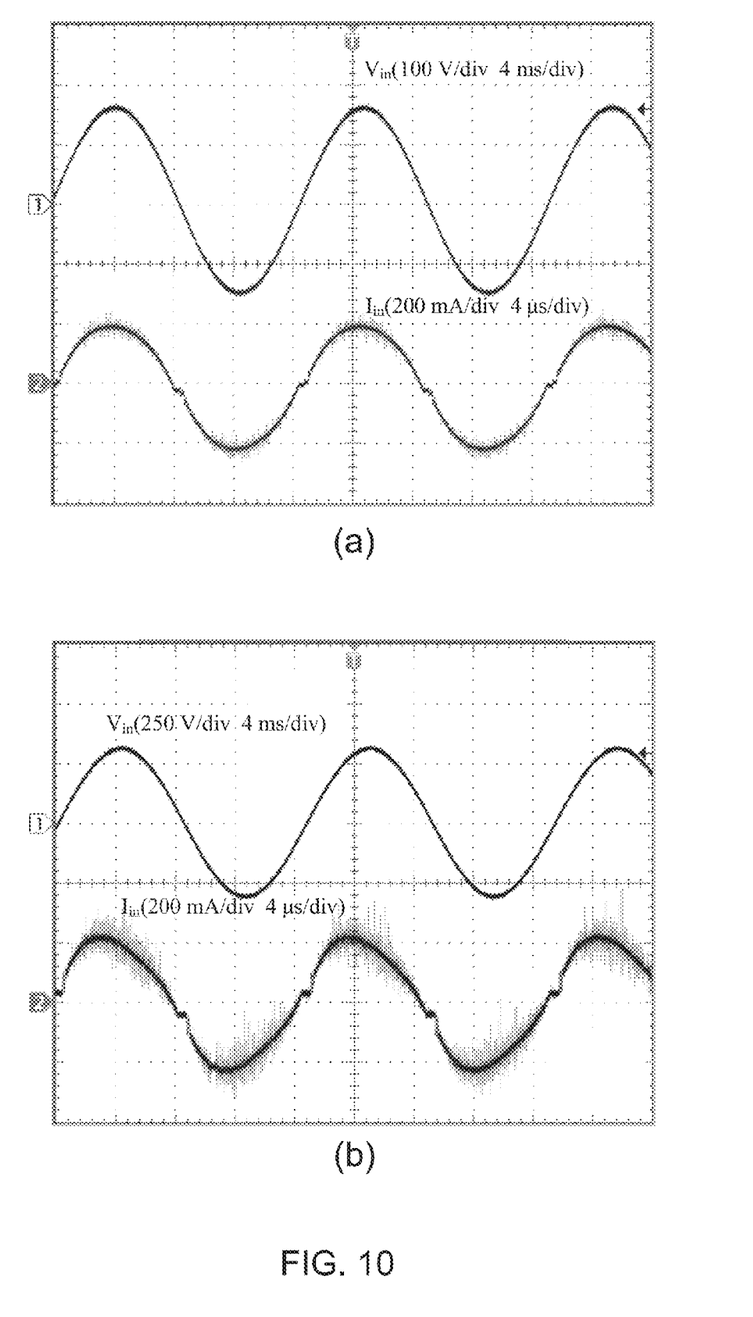
FIG. 10 is a waveform graph of input voltage and input current.

So that, the four circuit operation modes for this double-output high-efficiency LED light-modulating circuit has been completely introduced; next, experiment data are presented for proving the practicability and performance of the double-output high-efficiency LED light-modulating circuit. Please refer to FIG. 10, there is shown a waveform graph of input voltage and input current. The diagram (a) and (b) in FIG. 10 shows the input voltage $V_{in}$ waveforms of 110V and 220V, moreover, it can obviously find that the input voltage $V_{in}$ signal and the input current $I_{in}$ signal are almost in-phase, such that the power factor approaches to 1.

Figure 11:
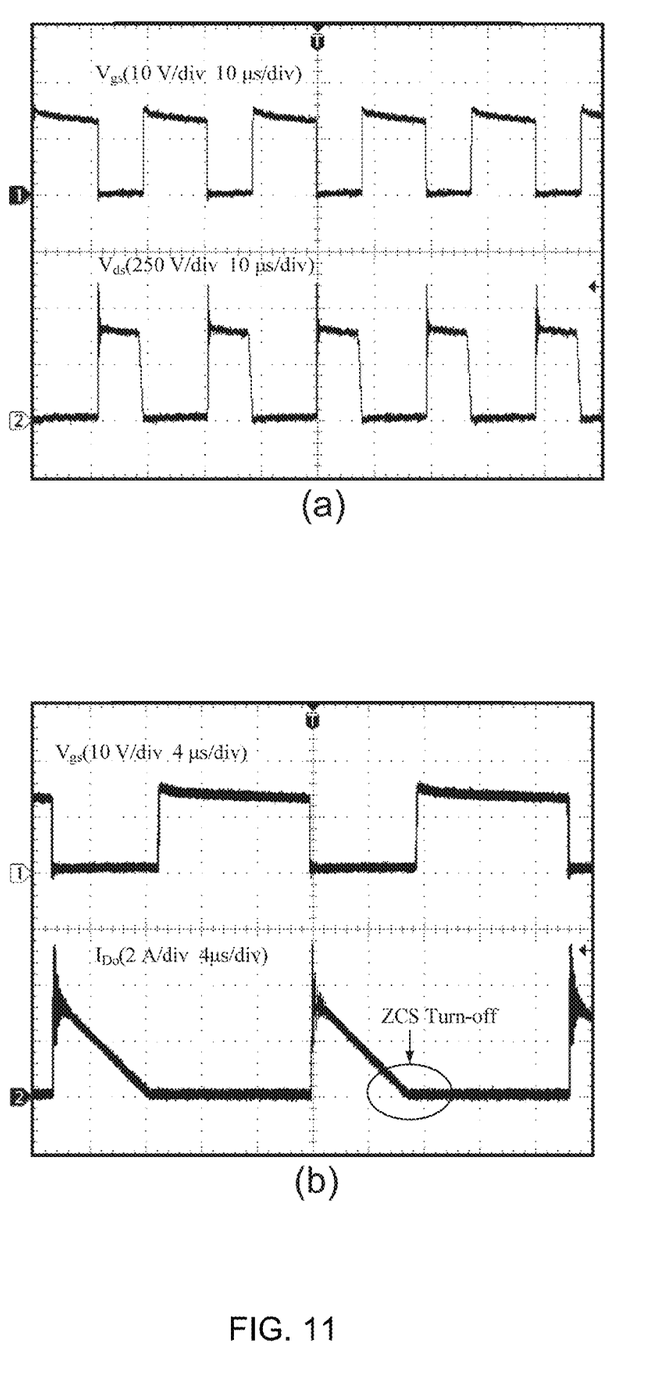
FIG. 11 is a waveform graph of a controlling signal for a switch $Q_1$.
Figure 12:
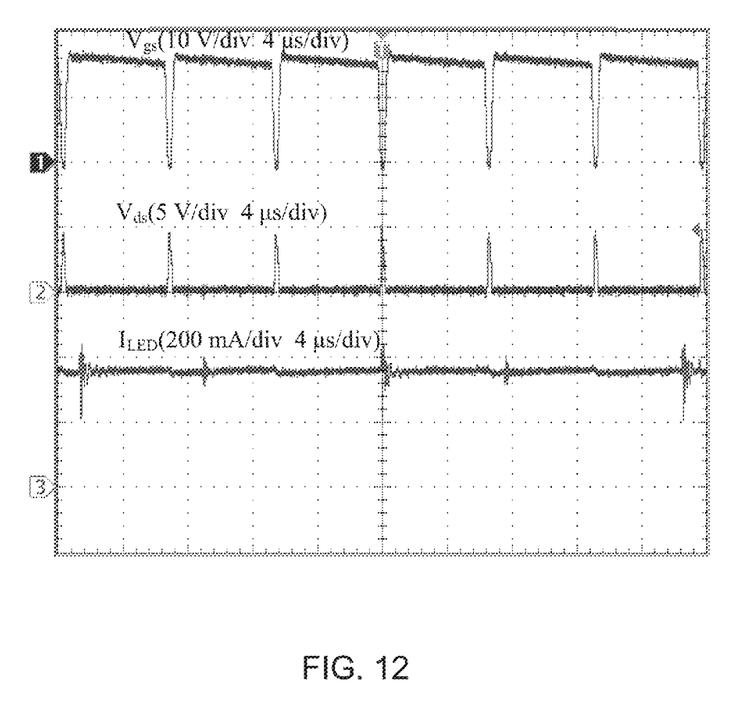
FIG. 12 is waveform graphs of a controlling signal for a switch $Q_1$ and an LED current signal $I_{LED}$.

Continuously, please refer to FIG. 11, there is shown a waveform graph of a controlling signal for a switch $Q_1$. The diagram (a) and (b) in FIG. 10 shows the $V_{gs}$ controlling signal and the $V_{ds}$ controlling signal for the switch $Q_1$ with the input voltage $V_{in}$ of 110V. In FIG. 10, it can find that the peak value of the $V_{ds}$ controlling signal for the switch $Q_1$ is 590V, and the current signal $I_{Do}$ of the first diode $D_1$ reduces to 0 before the $V_{gs}$ controlling signal is switched to high, that reveals the first diode $D_1$ is zero-current switched. In addition, please refer to FIG. 12, there are shown waveform graphs of a controlling signal for the switch Q1 and the LED current signal $I_{LED}$. It can find that the voltage crossing on the switch $Q_1$ is around 4 V~5V from FIG. 10; thus, because the cross voltage of the switch $Q_1$ has been reduced, a power switch with lower Rds can be used as the switch $Q_1$ in the DC/DC convertor 11 for increasing switching speed and reducing switching losses.

Figure 13:
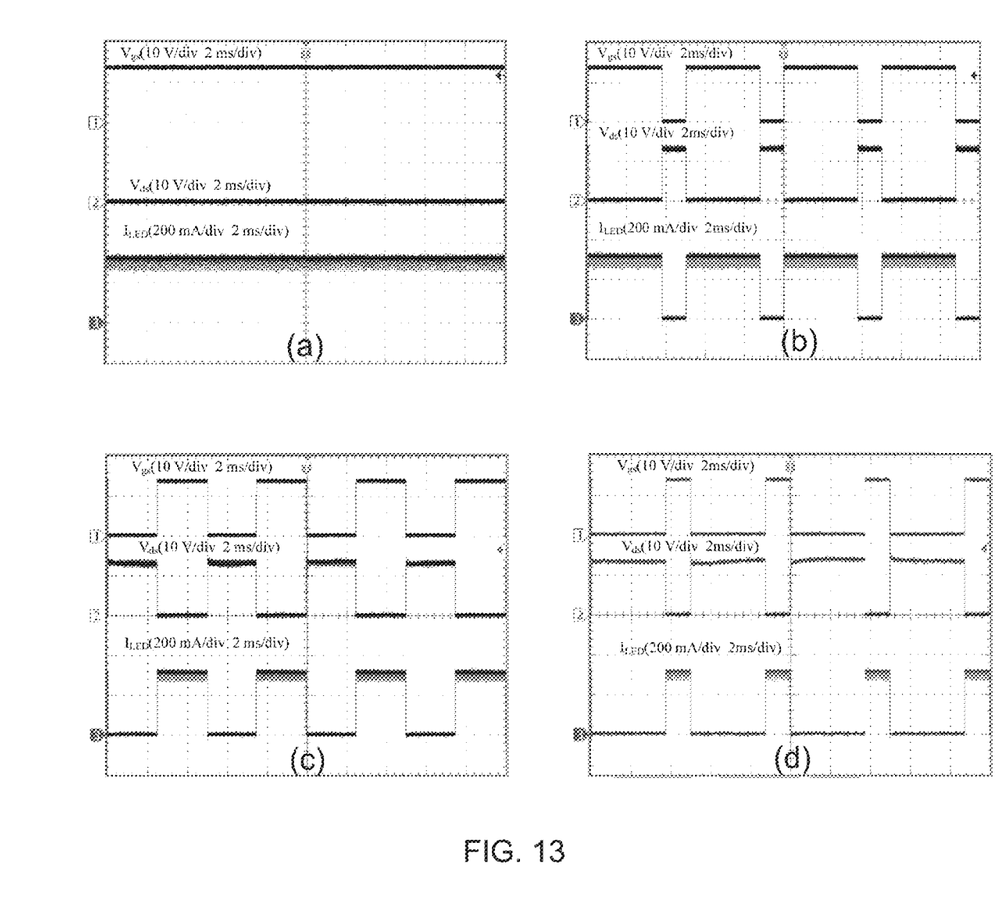
FIG. 13 is waveform graphs of a controlling signal for a light-modulating switch $Q_d$ and the LED current signal $I_{LED}$.

Please continuously refer to FIG. 13, there are shown waveform graphs of a controlling signal for the light-modulating switch $Q_d$ and the LED current signal $I_{LED}$, wherein the diagrams of (a), (b) and (c) in FIG. 13 respectively shows the signal waveforms for 100%, 75%, 50%, and 25% light modulation. Therefore, the practicability and performance of the double-output high-efficiency LED light-modulating circuit are proven by the waveforms of FIG. 11, FIG. 12 and FIG. 13.

Thus, through the descriptions, the circuit framework, circuit components, technology features, and performances of the double-output high-efficiency LED light-modulating circuit have been completely introduced and disclosed; in summary, the present invention has the following advantages:

1. In the present invention, it mainly utilizes the single-stage flyback power factor corrector for carrying out the purposes of reducing the components of an LED luminaire controlling circuit and increasing the circuit power conversion efficiency.
2. Moreover, this double-output high-efficiency LED light-modulating circuit further includes a twin-bus light modulation framework, which can not only reduce the cross voltage of the power switch in back-end DC/DC convertor, but also process a high-frequency light modulation and a low-frequency light modulation to the LED luminaire; therefore, because the cross voltage of the power switch has been reduced, a power switch with lower $R_{ds}$ can be used in the back-end DC/DC convertor for increasing switching speed and reducing switching losses.

The above description is made on embodiments of the present invention. However, the embodiments are not intended to limit scope of the present invention, and all equivalent implementations or alterations within the spirit of the present invention still fall within the scope of the present invention.

What is claimed is:

1. A double-output high-efficiency LED light-modulating circuit, comprising:
   a single-stage flyback power factor corrector, being coupled to an AC input voltage signal and capable of outputting a first LED voltage and a second LED voltage, so as to complete a twin-bus output; wherein the first LED voltage is slightly larger than the second LED voltage;
   a DC/DC convertor, being coupled to the single-stage flyback power factor corrector for receiving the first LED voltage and the second LED voltage;
   an LED module, being coupled to the DC/DC convertor and the single-stage flyback power factor corrector; and
   a light-modulating switch, being coupled to the LED module and the single-stage flyback power factor corrector, so as to receive the first LED voltage and process a high-frequency light modulation and a low-frequency light modulation to the LED module.

2. The double-output high-efficiency LED light-modulating circuit of claim 1, wherein the DC/DC convertor comprises:
   an inductor, being coupled to the LED module;
   a switch, being coupled to the inductor;
   a switch resistor, being coupled to the switch; and
   a first diode, being coupled between the LED module and the switch resistor and turned on when the high-frequency light modulation is processed.

3. The double-output high-efficiency LED light-modulating circuit of claim 2, further comprising a second diode, which is coupled between the light-modulating switch and the inductor and turned on when the low-frequency light modulation is processed.

4. The double-output high-efficiency LED light-modulating circuit of claim 1, wherein the LED module consists of a plurality of LED device.

5. The double-output high-efficiency LED light-modulating circuit of claim 1, wherein the single-stage flyback power factor corrector is a power controlling integrated circuit (IC) with serial number of L6561.

6. The double-output high-efficiency LED light-modulating circuit of claim 1, wherein the switch is a MOSFET.

7. The double-output high-efficiency LED light-modulating circuit of claim 1, wherein the switch is a MOSFET.

* * * * *